United States Patent
Chae

(10) Patent No.: US 11,441,874 B2
(45) Date of Patent: Sep. 13, 2022

(54) REMOTE WEAPON CONTROL DEVICE AND METHOD FOR TARGETING AND SHOOTING MULTIPLE OBJECTS

(71) Applicant: HANWHA DEFENSE CO., LTD., Changwon-si (KR)

(72) Inventor: Hee Seo Chae, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 478 days.

(21) Appl. No.: 15/904,989

(22) Filed: Feb. 26, 2018

(65) Prior Publication Data

US 2019/0145738 A1    May 16, 2019

(30) Foreign Application Priority Data

Nov. 10, 2017    (KR) .................. 10-2017-0149209

(51) Int. Cl.
| | |
|---|---|
| *F41G 3/16* | (2006.01) |
| *F41G 3/06* | (2006.01) |
| *G06T 7/70* | (2017.01) |
| *F41G 3/08* | (2006.01) |
| *F41A 23/34* | (2006.01) |
| *F41A 19/08* | (2006.01) |

(52) U.S. Cl.
CPC .............. *F41G 3/165* (2013.01); *F41A 19/08* (2013.01); *F41A 23/34* (2013.01); *F41G 3/065* (2013.01); *F41G 3/08* (2013.01); *G06T 7/70* (2017.01); *G06T 2200/24* (2013.01); *G06T 2207/20021* (2013.01); *G06T 2207/20092* (2013.01); *G06T 2207/30212* (2013.01)

(58) Field of Classification Search
CPC ................ F41G 3/165; G06T 2207/30212
See application file for complete search history.

(56) References Cited

U.S. PATENT DOCUMENTS

| | | | |
|---|---|---|---|
| 6,072,889 A * | 6/2000 | Deaett .................. | F41G 7/2226 342/62 |
| 7,210,392 B2 | 5/2007 | Greene et al. | |
| | (Continued) | | |

FOREIGN PATENT DOCUMENTS

| | | | | |
|---|---|---|---|---|
| EP | 3034983 A1 * | 6/2016 | ............... | F41G 3/04 |
| JP | 7-19867 A | 1/1995 | | |
| | (Continued) | | | |

OTHER PUBLICATIONS

Communication dated Mar. 22, 2021, issued by the Korean Intellectual Property Office in Korean Application No. 10-2017-0149209.

*Primary Examiner* — Gabriel J. Klein
(74) *Attorney, Agent, or Firm* — Sughrue Mion, PLLC

(57) ABSTRACT

A remote weapon control device for controlling a weapon having a photographing device is provided. The remote weapon control device includes: a communication interface configured to receive an image captured by the photographing device; an object extractor configured to extract objects from the image; a target extractor configured to extract targets from the objects; a shooting order determinator configured to determine an order of the targets for shooting; and a control signal generator configured to generate a shooting control signal for controlling the weapon to shoot the targets in the determined order.

19 Claims, 7 Drawing Sheets

(56) References Cited

U.S. PATENT DOCUMENTS

| | | | |
|---|---|---|---|
| 2003/0140775 A1* | 7/2003 | Stewart | F41G 3/06 89/41.05 |
| 2004/0068415 A1 | 4/2004 | Solomon | |
| 2006/0005447 A1* | 1/2006 | Lenner | F41G 3/165 42/111 |
| 2009/0128399 A1* | 5/2009 | Root, Jr. | G01S 13/867 348/166 |
| 2013/0212509 A1* | 8/2013 | Van Seggelen | G06F 8/70 715/771 |
| 2014/0109004 A1* | 4/2014 | Sadhvani | G06F 3/04842 715/810 |
| 2014/0110482 A1 | 4/2014 | Bay | |
| 2014/0251123 A1* | 9/2014 | Venema | F41H 11/02 89/41.22 |
| 2015/0345907 A1* | 12/2015 | Varga | F41G 3/147 89/41.05 |
| 2016/0377381 A1* | 12/2016 | Lyren | G02B 27/0189 345/633 |
| 2018/0080739 A1* | 3/2018 | Heo | F41G 5/24 |
| 2019/0137219 A1* | 5/2019 | Bockmon | F41G 3/165 |
| 2020/0124381 A1* | 4/2020 | Suk | F41G 3/04 |
| 2020/0166309 A1* | 5/2020 | Panas | F41G 3/005 |

FOREIGN PATENT DOCUMENTS

| | | |
|---|---|---|
| JP | 2001-525548 A | 12/2001 |
| KR | 100929878 B1 | 12/2009 |
| KR | 100963681 B1 | 6/2010 |
| KR | 10-2011-0127467 A | 11/2011 |
| KR | 101237129 B1 | 2/2013 |

\* cited by examiner

REMOTE WEAPON CONTROL DEVICE AND METHOD FOR TARGETING AND SHOOTING MULTIPLE OBJECTS

CROSS-REFERENCE TO THE RELATED APPLICATIONS

This application claims priority from Korean Patent Application No. 10-2017-0149209, filed on Nov. 10, 2017, in the Korean Intellectual Property Office, the disclosure of which is incorporated herein by reference in its entirety.

BACKGROUND

1. Field

Apparatuses and methods consistent with the exemplary embodiments of the present inventive concept relate to remotely operating a weapon, and more particularly, to a remote weapon control device and method for selecting a plurality of objects as targets and shooting the targets.

2. Description of the Related Art

A remote controlled weapon station (RCWS) or a remote weapon station (RWS) is a system that remotely operates a weapon. The RCWS generally includes a weapon mounted on a vehicle or a mobile robot, an imaging device for capturing images of targets, and a control device for remotely controlling the weapon. The control device may be located inside a vehicle or at a remote place.

In the RCWS, the weapon is manipulated not directly by a gunner but remotely through the control device. Therefore, the gunner can be protected from enemy attacks. In addition, precise targeting is possible depending on a performance of the imaging device.

Korean Patent Registration No. 10-0963681 (hereinafter, referred to as related art 1), Korean Patent Registration No. 10-1237129 (hereinafter, referred to as related art 2), and Korean Patent Registration No. 10-0929878 (hereinafter, referred to as related art 3) disclose related arts.

Related art 1 is an invention relating to a remote weapon shooting control system. Related art 1 proposes a system that can reduce shooting errors by generating a control signal for precisely aiming at a target.

Related art 2 is an invention relating to an aiming device for a remote controlled shooting system. Related art 2 proposes a device that maintains a zero point aim even when the gun is attached to or detached from a gun mount, so that an urgent situation can be quickly dealt with.

Related art 3 is an invention relating to a remote cannon operation system. Related Art 3 proposes a system in which a gunner operates a canon wirelessly from a remote place and a system in which one gunner operates multiple cannons simultaneously.

Although the above related arts propose different approaches to improve the RCWS, they are all based on a shooting procedure in which one object is targeted and then shot.

However, since such a shooting procedure requires a process of repeatedly targeting an object as many times as the number of objects to be shot, the time required to target multiple objects in order to shoot the objects increases in proportion to the number of objects to be shot. In this regard, the exemplary embodiments propose a remote weapon control device and method for rapidly performing shooting even when a plurality of objects are targeted.

SUMMARY

Exemplary embodiments of the inventive concept provide a method of selecting a plurality of objects as targets and shooting the targets for remotely operating a weapon.

Exemplary embodiments of the inventive concept also provide a method of determining a shooting priority order of a plurality of targets for remotely operating a weapon.

However, the exemplary embodiments of the inventive concept are not restricted to the ones set forth herein. Many other exemplary embodiments of the inventive concept will become more apparent to one of ordinary skill in the art to which the inventive concept pertains by referencing the detailed description of the exemplary embodiments given below.

According to an exemplary embodiment, there is provided a remote weapon control device for controlling a weapon having a photographing device. The remote weapon control device may include: a communication interface configured to receive an image captured by the photographing device; an object extractor configured to extract objects from the image; a target extractor configured to extract targets from the objects; a shooting order determinator configured to determine an order of the targets for shooting; and a control signal generator configured to generate a shooting control signal for controlling the weapon to shoot the targets in the determined order.

According to an exemplary embodiment, there is provided a remote weapon control method for controlling a weapon having a photographing device. The remote weapon control method may include: receiving an image captured by the photographing device; extracting objects from the image; receiving, from a user, a target selection command for selecting targets for shooting from the objects; extracting the targets from the objects according to the target selection command; determining an order of the targets for the shooting; generating a shooting control signal for controlling the weapon to shoot the targets in the determined shooting order; receiving a shooting authorization input from the user; and transmitting the shooting control signal to the weapon according to the shooting authorization input.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
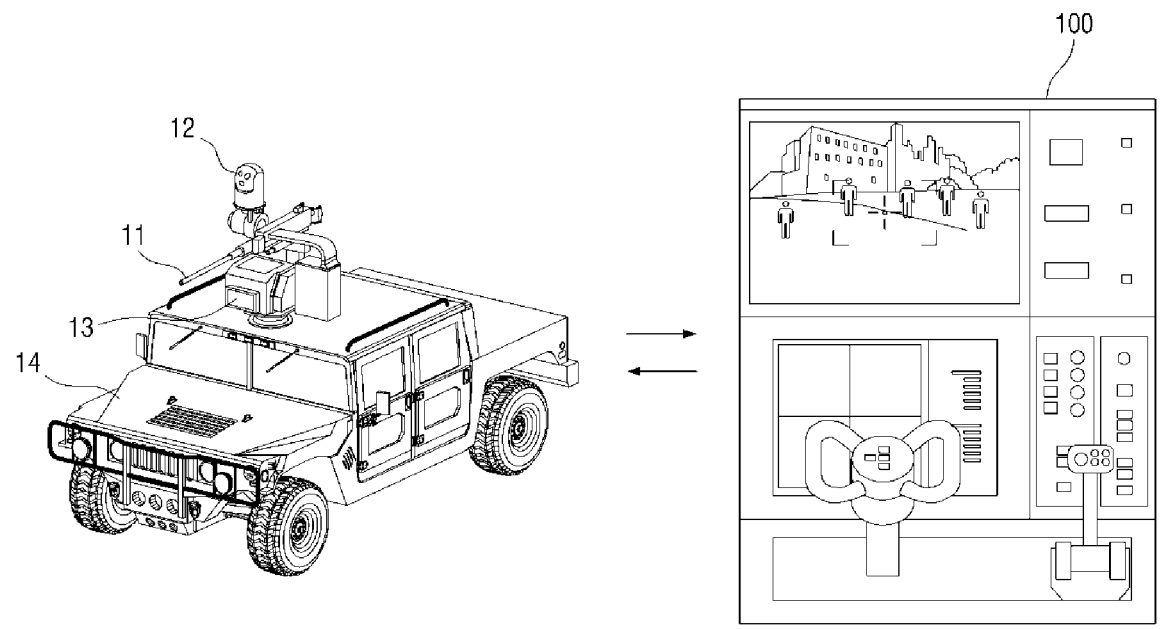
FIG. 1 illustrates a weapon and a remote weapon control device for controlling the weapon, according to an exemplary embodiment.

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims. Like reference numerals refer to like elements throughout the specification.

As used herein, objects refer to entities that can be shot in an image captured by a photographing device, and targets refer to objects to be shot from among the objects. That is, objects include targets, and objects selected as the targets from among the objects are targets for shooting.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

Hereinafter, exemplary embodiments will be described in detail with reference to the attached drawings.

FIG. 1 illustrates a weapon 11 and a remote weapon control device 100 for controlling the weapon 11, according to an exemplary embodiment.

Weapons to be controlled by the remote weapon control device 100 include a weapon mounted on a movable body. A movable body 14 may be an unmanned ground vehicle or a manned ground vehicle. If the movable body 14 is an unmanned ground vehicle, the remote weapon control device 100 may be disposed at a remote place. If the movable body 14 is a manned ground vehicle, the remote weapon control device 100 may be disposed inside the manned ground vehicle. However, the position of the remote weapon control device 100 may not be limited thereto according to the type of the movable body 14. It will be obvious to those skilled in the art that the weapons to be controlled by the remote weapon control device 100 include a weapon mounted on a fixed body.

The weapon 11 may include a photographing device 12. The photographing device 12 is a device for photographing objects, and may include at least one of a charge coupled device (CCD) camera and an infrared radiation (IR) camera. The IR camera may be used when it is difficult to photograph objects with the CCD camera, for example, at night or at a forest. According to an exemplary embodiment, another type of camera may also be included in the weapon 11.

The weapon 11 may also include a distance measuring sensor 13. The distance measuring sensor 13 is a device for measuring a distance between each object and the weapon 11 and may include a laser rangefinder (LRF). With the LRF, it is possible to measure not only the distance but also speed of the object when it moves by using the Doppler effect. According an exemplary embodiment, another type of sensor may also be included in the weapon 11.

The weapon 11, the photographing device 12, and the distance measuring sensor 13 may be configured to be driven independently. That is, the weapon 11, the photographing device 12, and the distance measuring sensor 13 may be driven such that a point at which the weapon 11 is aimed, a point at which the photographing device 12 is directed to take a photograph, whether it is a still picture or a moving picture, and a point to which a distance is measured by the distance measuring sensor 13 may be different from one another. According to an exemplary embodiment, the weapon 11, the photographing device 12 and the distance measuring sensor 13 may be configured to be driven to be dependent on one another. According to an exemplary embodiment, the point at which the weapon 11 is aimed, the point at which the photographing device 12 is directed to take the photograph, and the point to which the distance is measured by the distance measuring sensor 13 may be the same.

The remote weapon control device 100 is a device capable of controlling the weapon 11, the photographing device 12, the distance measuring sensor 13, and the movable body 14. As described above, if the movable body 14 is an unmanned ground vehicle, the remote weapon control device 100 may be disposed at a remote place. In addition, if the movable body 14 is a manned ground vehicle, the remote weapon control device 100 may be disposed inside the manned ground vehicle. The configuration and operation of the remote weapon control device 100 will now be described.

Figure 2:
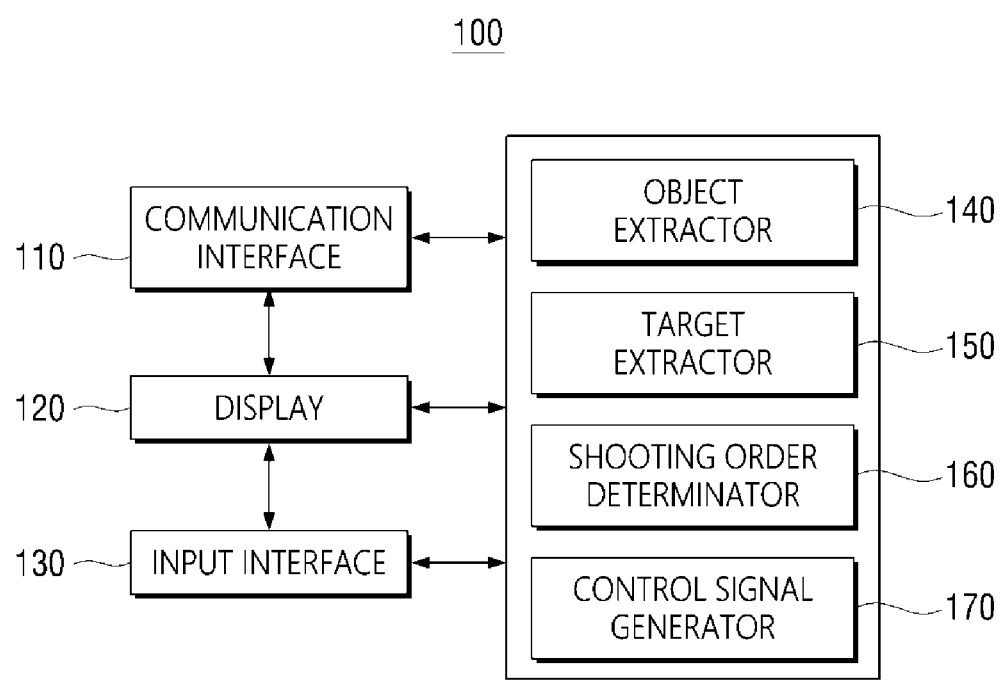
FIG. 2 illustrates a configuration of a remote weapon control device according to an embodiment according to an exemplary embodiment.

FIG. 2 illustrates the configuration of a remote weapon control device 100 according to an exemplary embodiment. The remote weapon control device 100 according to the exemplary embodiment includes a communication interface 110, a display 120, an input interface 130, an object extractor 140, a target extractor 150, a shooting order determinator 160, and a control signal generator 170.

The communication interface 110 transmits and receives data required to control the weapon 11. The communication interface 110 may receive images photographed by the photographing device 12, distances measured by the distance measuring sensor 13, and driving information about the weapon 11, the photographing device 12 and the distance measuring sensor 13. In addition, the communication interface 110 may transmit a control signal generated by the control signal generator 170 to control the weapon 11, the photographing device 12 and the distance measuring sensor 13.

Here, the communication interface 110 may include any one or any combination of a digital modem, a radio frequency (RF) modem, a WiFi chip, and related software and/or firmware.

Further, at least one of the object extractor 140, the target extractor 150, the shooting order determinator 160, and the control signal generator 170 may be embodied as various numbers of hardware, software and/or firmware structures that execute respective functions described above, according to an exemplary embodiment. For example, at least one of the foregoing components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

When the remote weapon control device 100 is disposed at a remote place, the communication interface 110 may transmit and receive data using wireless communication. When the remote weapon control device 100 is disposed inside a manned ground vehicle, the communication interface 110 may transmit and receive data using wired communication.

The display 120 includes a display panel and displays an image received by the communication interface 110 on the display panel. The display 120 may perform decoding and rendering to display an image. In addition, the display 120 may display the distances between the weapon 11 and objects received by the communication interface 110 on the display panel.

The input interface 130 receives a command necessary for weapon control from a user. When the display panel of the display 120 is a touch screen, the input interface 130 may be configured as the touch screen. Alternatively, the input interface 130 may be configured as a device capable of receiving an input, such as a mouse, a keyboard, or a touch screen.

The object extractor 140 extracts objects from an image received by the communication interface 110. The object extractor 140 may extract moving objects using an image processing algorithm that separates the moving objects from a background in the image. Alternatively, the object extractor 140 may extract still objects using the image processing algorithm that uses metadata to separate shapes similar to the metadata from the background in the image.

In addition, the object extractor 140 calculates coordinates of the objects extracted from the image. The coordinates of the objects may be calculated using an X-Y coordinate system having a reference point of the image as its origin. The reference point of the image may be set to a center point of the image or to a point located at another position, e.g., a lower left corner, of the image. The coordinates of the objects may also be calculated using the location of the center point of each object with respect to the reference point of the image.

In addition, the object extractor 140 may identify an object that has been shot among the extracted objects. The object extractor 140 may monitor the objects in the image after shooting, and identify an object that has been shot. For example if an object to be shot is not extracted from the image after shooting, the object extractor 140 may identify the object as an object that has been shot. Alternatively, if an object to be shot is determined to have stopped moving as a result of comparing the image before and after shooting and if the distance between the center point of the object and the ground is equal to or smaller than a reference value, the object extractor 140 may presume that the object has fallen on the ground and identify the object as an object that has been shot.

The object extractor 140 may also identify a friendly object. To this end, the object extractor 140 may detect n object having a friendly mark among the extracted objects. The friendly mark is a mark that distinguishes a friendly object from non-friendly or hostile objects, such as a badge, a uniform, or an appearance of an object. The object extractor 140 may identify an object having the friendly mark as a friendly object.

Figure 3:
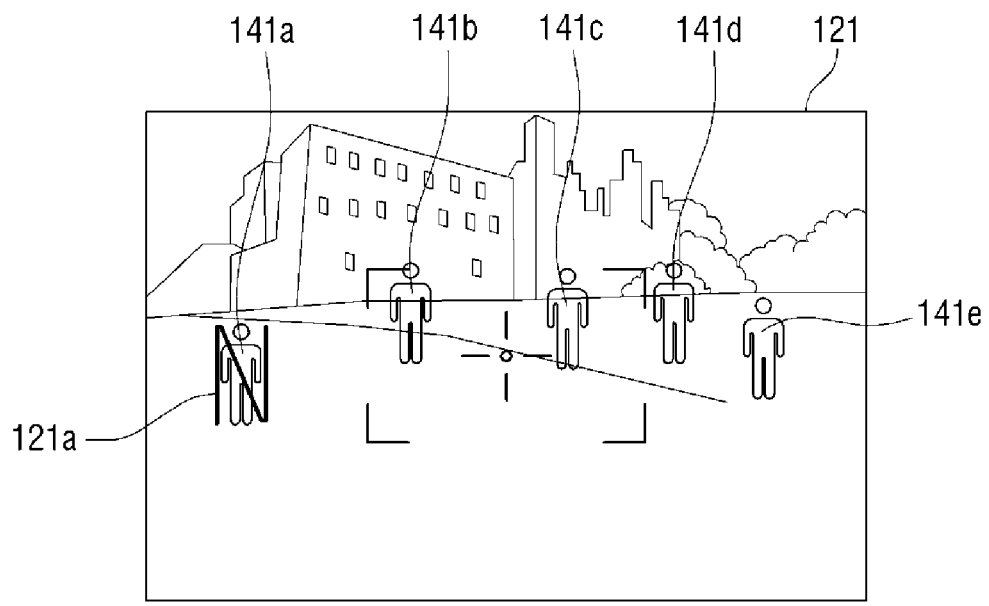
FIG. 3 illustrates an image from which objects have been extracted by an object extractor, according to an exemplary embodiment.

FIG. 3 illustrates an image 121 from which objects have been extracted by the object extractor 140, according to an exemplary embodiment. The object extractor 140 extracted five objects 141*a* through 141*e* from the image 121. Among the extracted objects 141*a* through 141*e*, one object 141*a* was identified as a friendly object by a friendly mark. The display 120 may display a mark 121*a* for indicating a friendly object on the object 141*a* identified as a friendly object by the object extractor 140. The object extractor 140 may calculate coordinates of the five objects 141*a* through 141*e* based on the center point of the image 121.

Referring back to FIG. 2, the target extractor 150 extracts targets to be shot from the objects extracted by the object extractor 140. The target extractor 150 may extract the targets according to a target selection command received from the user through the input interface 130.

The target selection command includes an area division command and an area selection command. The area division command is a command to divide a displayed image into a plurality of areas. The area selection command is a command to select at least one of the areas.

The area division command may be generated by displaying a boundary line for dividing an image on the image. When the input interface 130 is configured as a touch screen, the user may display the boundary line for dividing the image by directly touching the touch screen. Alternatively, when the input interface 130 is configured by a mouse, the user may display the boundary line for dividing the image by simultaneously clicking and dragging the mouse.

The area selection command may be generated by selecting at least one of areas into which an image has been divided by the area division command. When the input interface 130 is configured as a touch screen, the user may select a desired area from the areas by touching the desired area. When the input interface 130 is configured as a mouse, the user may select a desired area from the areas by clicking on the desired area.

When the area division command and the area selection command are input as the target selection command, the target extractor 150 may extract objects located in a selected area as targets. The target extractor 150 does not extract an object, which has been identified as a friendly object, as a target.

Figure 4:
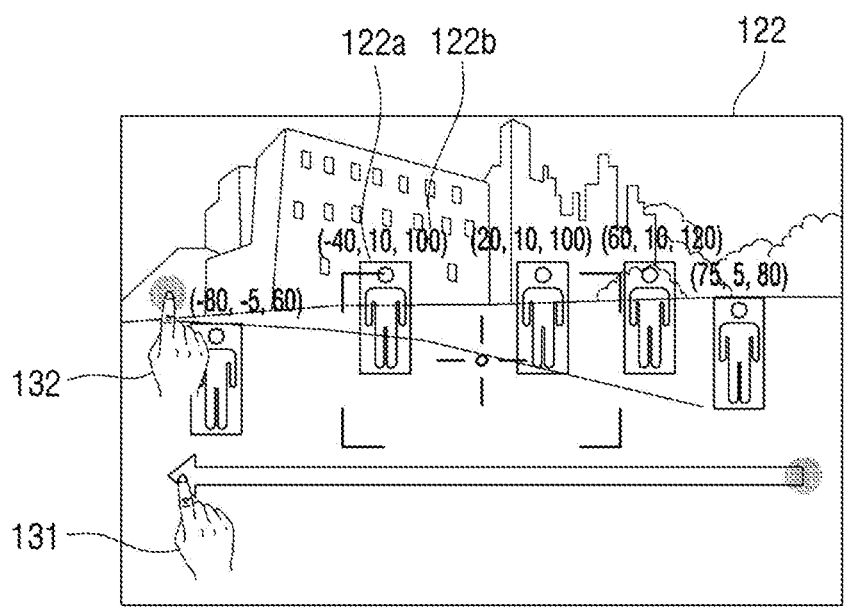
FIG. 4 illustrates an embodiment in which targets are extracted according to a target selection command, according to an exemplary embodiment.

FIG. 4 illustrates an exemplary embodiment in which targets are extracted according to the target selection command. In response to an area division command 131 for dividing an image 122 into a plurality of areas and an area selection command 132 for selecting an upper area from the areas, the target extractor 150 extracts objects located in the selected area as targets.

Once the targets are extracted, the display 120 may display a mark 122a for each of the extracted targets, so that the user can visually recognize the extracted targets. In FIG. 4, the mark 122a is illustrated as a rectangle. However, a form or a shape of the mark 122a is not being limited to that shown in FIG. 4. In addition, the display 120 may display coordinates 122b of the extracted targets obtained from the object extractor 140 and distances received from the distance measuring sensor 13. The coordinates 122b illustrated in FIG. 4 include an X-coordinate of each target in the image 122, a Y-coordinate of each target in the image 122 and a coordinate corresponding a distance of each target from the weapon 11. Here, the distance of each target may be a Z-coordinate thereof.

Figure 5:
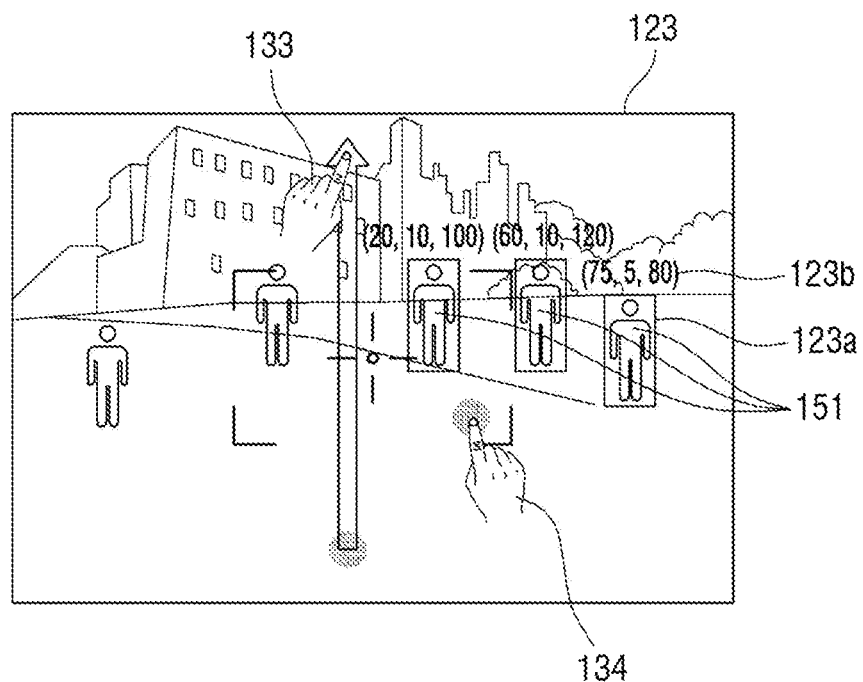
FIG. 5 illustrates an embodiment in which targets are extracted according to a target selection command, according to an exemplary embodiment.

FIG. 5 illustrates an exemplary embodiment in which targets are extracted according to a target selection command. In response to an area division command 133 for dividing an image 123 into a plurality of areas and an area selection command 134 for selecting a right area from the areas, the target extractor 150 extracts objects located in the selected area as targets.

In the embodiment of FIG. 5, three out of five objects were extracted as targets. The display 120 may display a mark 123a and coordinates 123b of the three targets 151.

Figure 6:
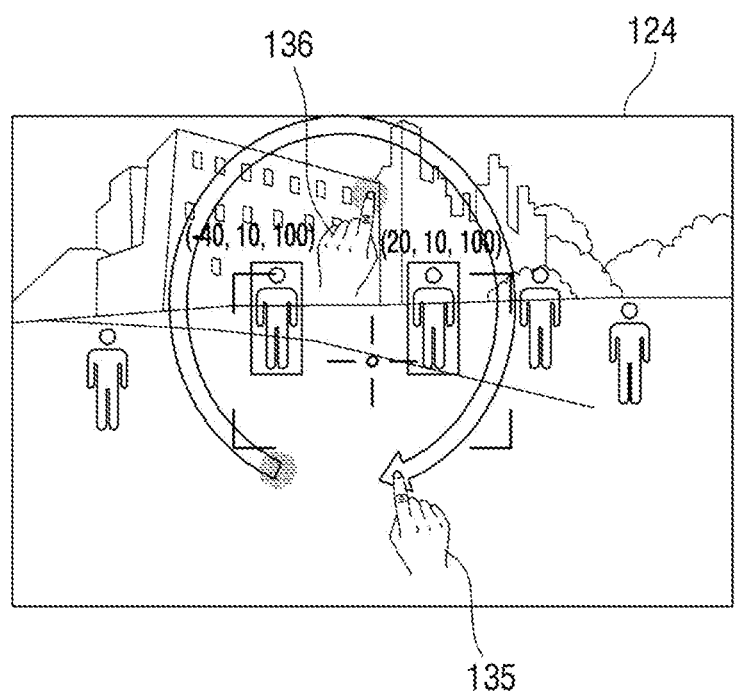
FIG. 6 illustrates an embodiment in which targets are extracted according to a target selection command, according to an exemplary embodiment.

FIG. 6 illustrates an exemplary embodiment in which targets are extracted according to a target selection command. In the embodiment of FIG. 4 and the embodiment of FIG. 5, an area division command is formed as a straight boundary line. On the other hand, in the embodiment of FIG. 6, the area division command is formed as a curved boundary line. In response to an area division command 135 for dividing an image 124 into a plurality of areas and an area selection command 136 for selecting an area located inside a boundary line corresponding to the area division command 135 from the areas, the target extractor 150 extracts objects located in the selected area as targets.

Referring back to FIG. 2, the target selection command may further include a select all command. The select all command is a command to select all objects, excluding friendly objects, in an image as targets. The select all command may be generated by selecting a point in an image twice in a row or selecting the point in the image for several seconds or more. When the input interface 130 is configured as a touch screen, the user may generate the select all command by touching a point twice in a row or by long-pressing the point. When the input interface 130 is configured as a mouse, the user may generate the select all command by double-clicking on the point or maintaining the clicked state for several seconds or more.

When the select all command is input as the target selection command, the target extractor 150 may extract all objects, excluding friendly objects, as targets.

In addition, the target selection command may further include an individual selection command. The individual selection command may be generated by selecting targets from the objects one by one. When the input interface 130 is configured as a touch screen, the user may generate the individual selection command by touching each target among the objects. When the input interface 130 is configured as a mouse, the user may generate the individual selection command by clicking on each target among the objects.

When the individual selection command is input as the target selection command, the target extractor 150 may extract objects selected from the objects as targets.

The shooting order determinator 160 determines an order in which the targets extracted by the target extractor 150 are to be shot by the weapon 11. The shooting order determinator 160 may determine the shooting order based on the distances between the weapon 11 and the targets measured by the distance measuring sensor 13.

A first algorithm used by the shooting order determinator 160 to determine the shooting order is to determine the shooting order based on the distances between the targets and the weapon 11. The shooting order determinator 160 may determine the shooting order by prioritizing the targets in order of the largest to the smallest distance from the weapon 11.

The first algorithm can be applied when the targets are stationary or when the targets are moving away from the weapon 11. When shooting is performed according to the first algorithm, an accuracy rate of the shooting is improved because a target farthest from the weapon 11 is shot first.

A second algorithm used by the shooting order determinator 160 to determine the shooting order is to determine the shooting order based on an amount of change in a distance between each of the targets and the weapon 11. The shooting order determinator 160 may determine the shooting order by prioritizing the targets in order of the smallest to the largest distance from the weapon 11.

The second algorithm can be applied when the targets are approaching the weapon 11. When shooting is performed according to the second algorithm, the threat to the weapon 11 can be efficiently eliminated because a target closest to the weapon 11 is shot first.

A third algorithm used by the shooting order determinator 160 to determine the shooting order is to determine the shooting order based on the distances between the targets and the weapon 11 and the amount of change in each of the distances. The third algorithm is an algorithm for determining the shooting order based on the locations of the targets predicted after a reference time. The shooting order determinator 160 may calculate a distance ($d(n+1)$) between each of the targets and the weapon 11 predicted after a reference time t by adding current distance $d(n)$ between each of the targets and the weapon 11 to a value obtained by multiplying an amount $v(n)$ of change in the current distance $d(n)$ and the reference time t. An equation used in the third algorithm is summarized as $$d(n+1)=d(n)+(t \times v(n)).$$

The shooting order determinator 160 may determine the shooting order by prioritizing the targets in order of the smallest to the largest distance (d(n+1)) between the targets and the weapon 11 predicted after the reference time. Here, the reference time is a value set by a user. For example, if the reference time is set to two seconds, the shooting order is determined based on the distances between the weapon 11 and the targets predicted after two seconds.

The third algorithm can be applied when the first algorithm and the second algorithm are not applicable. That is, the third algorithm can be applied when there are both a target approaching the weapon 11 and a target moving away from the weapon 11. When shooting is performed according to the third algorithm, it is possible to predict a location of a target and shoot the target based on the predicted location.

Figure 7:
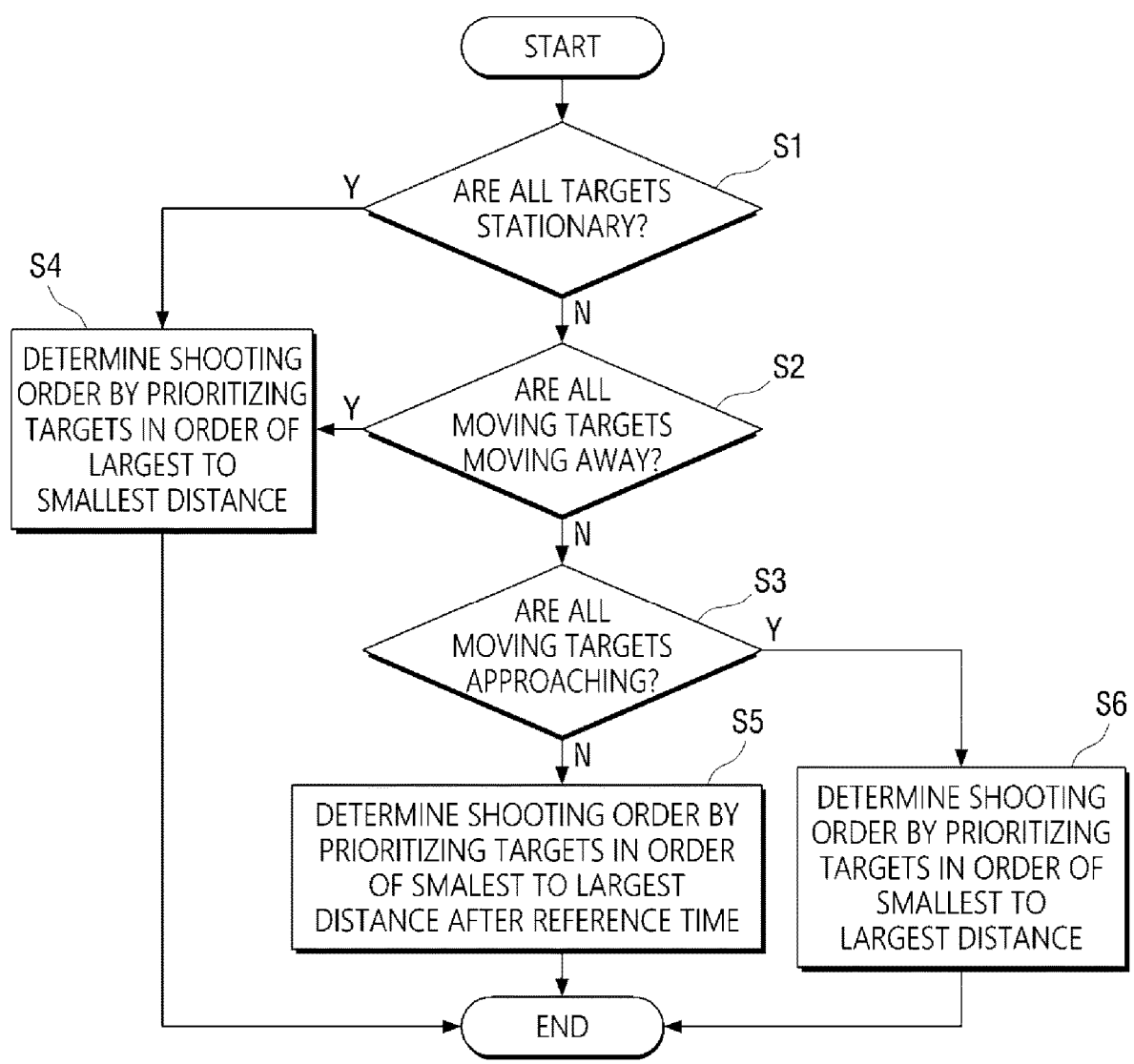
FIG. 7 illustrates a method of determining a shooting order using a shooting order determinator, according to an exemplary embodiment.

FIG. 7 illustrates a method of determining a shooting order using the shooting order determinator 160 according to an exemplary embodiment. The shooting order determinator 160 determines whether all targets are stationary (operation S1). When all targets are stationary, the shooting order determinator 160 determines a shooting order according to the first algorithm (operation S4). When not all targets are stationary, the shooting order determinator 160 determines whether all moving targets are moving away from a weapon 11 (operation S2). When all moving targets are moving away from the weapon 11, the shooting order determinator 160 determines the shooing order according to the first algorithm (operation S4). When all moving targets are not moving away from the weapon 11, the shooting order determinator 160 determines whether all moving targets are approaching the weapon 11 (operation S3). If all moving targets are approaching the weapon 11, the shooting order determinator 160 determines the shooting order according to the second algorithm (operation S6). In other cases, the shooting order determinator 160 determines the shooting order according to the third algorithm (operation S5).

The method illustrated in FIG. 7 is an exemplary embodiment in which the shooting order determinator 160 determines the shooting order. The shooting order determinator 160 can also determine the shooting order in a way different from this embodiment. For example, the shooting order determinator 160 can determine the shooting order by applying only the first algorithm in all cases or by applying an algorithm selected by a user.

Referring back to FIG. 2, the control signal generator 170 generates a shooting control signal to control the weapon 11 to shoot the targets in the order determined by the shooting order determinator 160. The shooting control signal may include information about the targets, such as azimuths, elevations and distances arranged such that the weapon 11 can aim at the targets in the shooting order.

The shooting control signal generated by the control signal generator 170 may be transmitted through the communication interface 110. Here, the communication interface 110 may be set to transmit the generated shooting control signal to the weapon 11 when a shooting authorization command is input to the input interface 130. If the shooting control signal is set to be transmitted only when the shooting authorization command is input, since a user confirmation procedure about shooting is performed before the shooting, the safety of weapon management can be improved.

The control signal generator 170 generates a shooting stop signal to control the weapon 11 to stop shooting when a shooting stop command is input to the input interface 130. When the shooting stop signal is generated, the communication interface 110 may immediately transmit the shooting stop signal to the weapon 11 so that the weapon 11 can immediately stop shooting.

Figure 8:
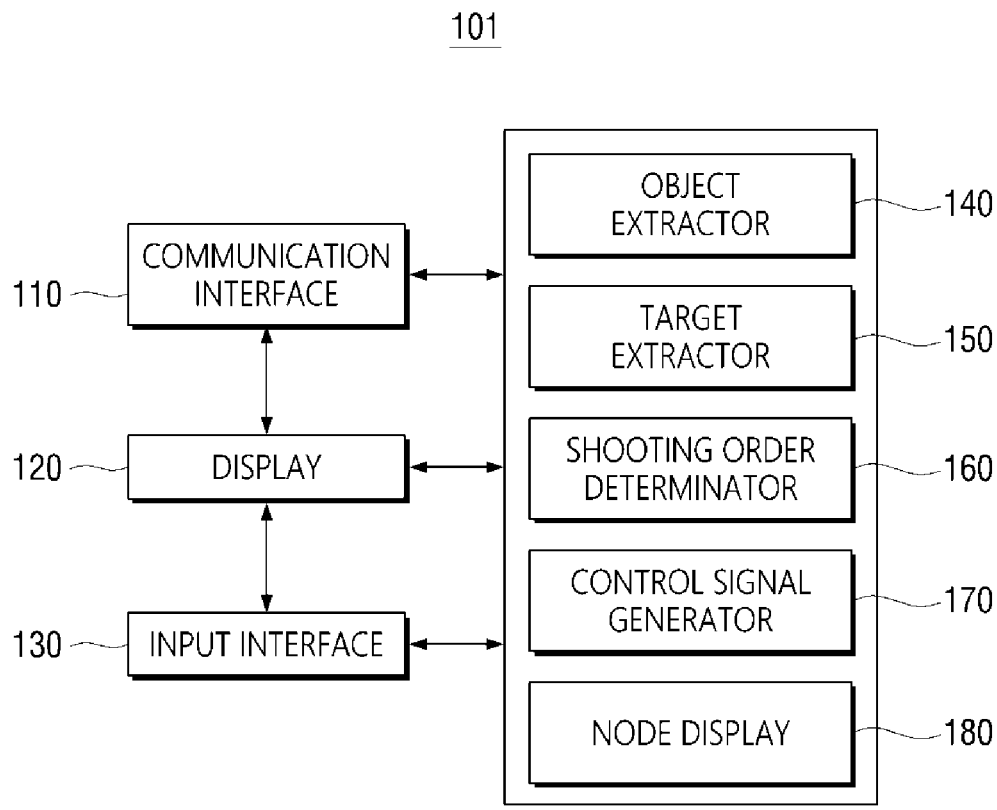
FIG. 8 illustrates a configuration of a remote weapon control device according to an exemplary embodiment.

FIG. 8 illustrates the configuration of a remote weapon control device 101 according to an exemplary embodiment. The remote weapon control device 101 according to the current embodiment is different from the remote weapon control device 100 according to the embodiment of FIG. 2 in that it further includes a node display 180.

The node display 180 generates nodes corresponding to targets in an image. In addition, the node display 180 displays the generated nodes on the display panel of the display 120. The node display 180 may overlay the generated nodes on the image or display the generated nodes in a window independent of the image. The node display 180 may include a display panel like the display 120 illustrated in FIG. 2.

The node display 180 generates the nodes at locations corresponding to those of the targets in the image. To this end, the node display 180 calculates reference coordinates representing the targets in the image, and calculates relative coordinates of the targets with respect to the reference coordinates. Then, the node display 180 generates nodes having the relative coordinates with respect to the reference coordinates as their coordinate values. An exemplary embodiment in which the node display 180 generates nodes will now be described with reference to FIG. 9.

Figure 9:
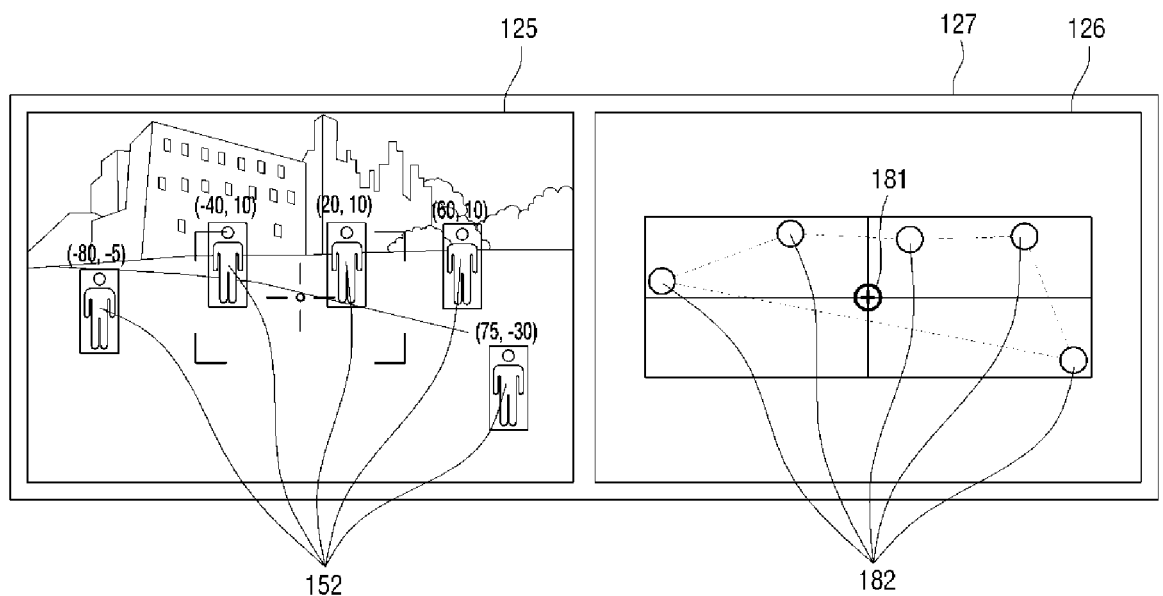
FIG. 9 illustrates nodes generated at locations corresponding to those of targets, according to an exemplary embodiment.

FIG. 9 illustrates nodes generated at locations corresponding to those of targets. The node display 180 may use an average of coordinates of targets 152 as reference coordinates representing the targets 152 in an image 125. Since the coordinates of the targets 152 are (−80, −5), (−40, 10), (20, 10), (60, 10) and (75, −30), the average coordinates are (7, −1) obtained by taking the averages of the X-axis coordinates and the Y-axis coordinates, respectively.

The node display 180 calculates relative coordinates of the targets 152 with respect to the average coordinates (7, −1). The relative coordinates of the targets 152 with respect to the average coordinates (7, −1) are calculated to be (−87, −4), (−47, 11), (13, 11), (53, 11) and (68, −29).

The node display 180 generates nodes 182 having the relative coordinates as their coordinate values by using the average coordinates as a reference point 181 of the nodes 182. As can be seen by comparing the nodes 182 generated by the node display 180 and the targets 152, the nodes 182 are arranged in the same manner as the targets 152. The nodes 182 generated by the node display 180 may be overlaid on the image 125 or displayed in a window 126 independent of the image 125 on a display panel 127 of the display 120. When the nodes 182 are displayed in the independent window 126, the reference point 181 of the nodes 182 may be located at the average coordinates, so that the locations of the nodes 182 in the independent window 126 are the same as the locations of the targets 152 in the image 125.

Referring back to FIG. 8, the node display 180 may change a size of each node according to an amount of change in a distance between the weapon 11 and each target in the image. When the distance between the weapon 11 and a target increases, the node display 180 may reduce the size of a node generated at a location corresponding to that of the target. When the distance between the weapon 11 and the target decreases, the node display 180 may increase the size of the node. An exemplary embodiment in which the node display 180 changes the sizes of nodes will now be described with reference to FIG. 10.

Figure 10:
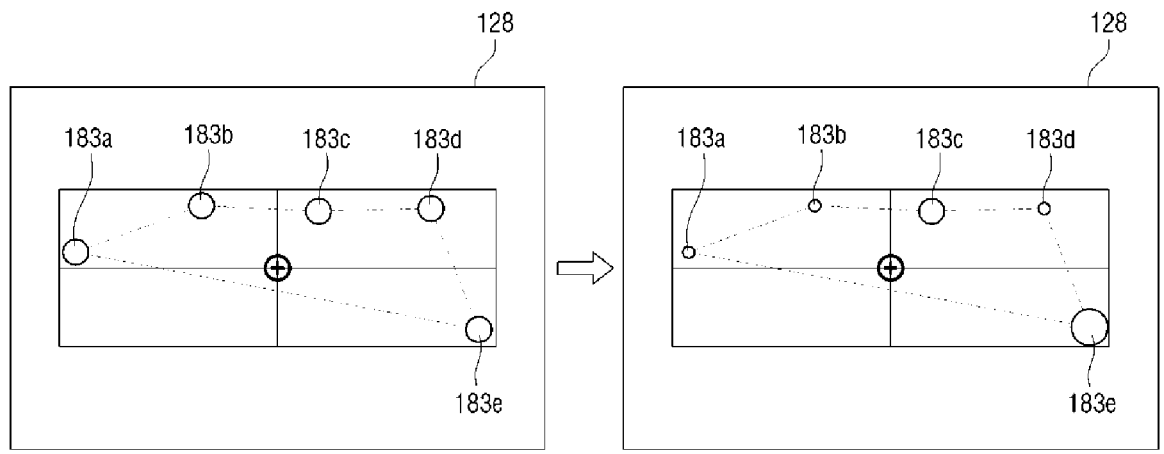
FIG. 10 illustrates nodes whose sizes have been changed, according to an exemplary embodiment.

FIG. 10 illustrates a change in the size of each node displayed in an independent window 128. When targets corresponding to a first node 183a, a second node 183b and a fourth node 183d are moving away from the weapon 11, the sizes of the first node 183a, the second node 183b and the fourth node 183d are reduced by the node display 180 in inverse proportion to the distances of the targets from the weapon 11. In addition, when the distance between a target corresponding to a third node 183c and the weapon 11 does not change, the size of the third node 183c is maintained. Also, when a target corresponding to a fifth node 183e is approaching the weapon 11, the size of the fifth node 183e is increased by the node display 180 in inverse proportion to the distance of the target to the weapon 11.

If nodes are generated as simplified forms of targets and displayed on a display panel, a user can intuitively recognize the locations of the targets. In addition, since the sizes of the nodes are changed according to a change in the distances between the weapon 11 and the targets, the user can intuitively recognize a change in the locations of the targets.

Referring back to FIG. 8, when a target that has been shot is identified by the object extractor 140, the node display 180 may regenerate nodes to exclude a node corresponding to the shot target. An exemplary embodiment in which the node display 180 regenerates nodes will now be described with reference to FIG. 11.

Figure 11:
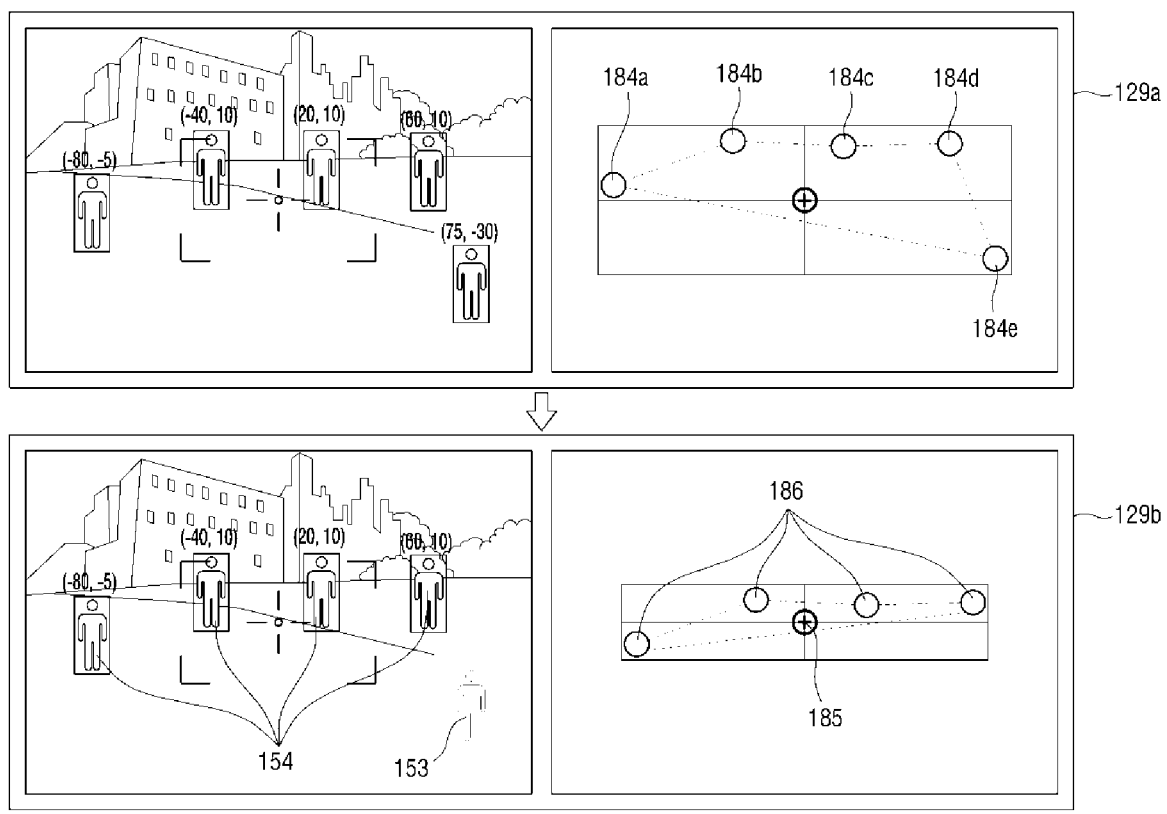
FIG. 11 illustrates nodes regenerated, according to an exemplary embodiment.

FIG. 11 illustrates nodes regenerated. In FIG. 11, a display panel 129a before nodes are regenerated, and a display panel 129b after the nodes are regenerated are illustrated.

After nodes 184a through 184e corresponding to targets are generated by the node display 180, if a target 153 that has been shot is identified by the object extractor 140, the node display 180 regenerates nodes to exclude the node 184e corresponding to the identified target 153.

The node display 180 uses an average of coordinates of targets 154 excluding the identified target 153 as reference coordinates representing the targets 154. Since the coordinates of the targets 154 are (−80, −5), (−40, 10), (20, 10) and (60, 10), the average coordinates are (−8, 5) obtained by taking the averages of the X-axis coordinates and the Y-axis coordinates, respectively.

The node display 180 calculates relative coordinates of the targets 154 with respect to the average coordinates (−8, 5). The relative coordinates of the targets 154 with respect to the average coordinates (−8, 5) are calculated to be (−72, 10), (−32, 5), (28, 5) and (68, 5). The node display 180 generates nodes 186 having the relative coordinates as their coordinate values by using the average coordinates as a reference point 185 of the new nodes 186.

Referring back to FIG. 8, the control signal generator 170 generates a photographing device control signal to control the photographing device 12 to track the targets. Here, the control signal generator 170 may generate the photographing device control signal to control the photographing device 12 to track the targets by using the coordinates of the targets in the image or the coordinates of the nodes.

When the coordinates of the nodes are used, if a node farthest from the center point moves away from the center point while the reference point of the nodes does not move, the control signal generator 170 may generate the photographing device control signal to control the photographing device 12 to zoom out. Alternatively, if the node farthest from the center point approaches the center point while the reference point of the nodes does not move, the control signal generator 170 may generate the photographing device control signal to control the photographing device 12 to zooms in. Alternatively, if the reference point of the nodes moves, the control signal generator 170 may generate the photographing device control signal to control the photographing device 12 to pan or tilt. The control signal generation 170 may also generate the photographing device control signal in similar manner by using the coordinates of the targets.

Alternatively, when the moving speed of the reference point of the nodes is equal to or greater than a reference value, the control signal generator 170 may determine that it is difficult to track the moving targets only by driving the photographing device 12 and generate a movable body control signal to control the movable body 14 (FIG. 1) to track the targets. Here, the reference value may be set by a user.

Alternatively, the control signal generator 170 may generate the photographing device control signal or the movable body control signal such that a target having a highest priority determined by the shooting order determinator 160 is included in an image.

To control the photographing device 12 to track the target having the highest priority, the control signal generator 170 may monitor whether the target having the highest priority is included in an image. If the target having the highest priority is not included in a current image, the control signal generator 170 may estimate the current location of the target by using moving speed of the target in previous images. Then, the control signal generator 170 may generate the photographing device control signal for controlling panning, tilting and zooming of the photographing device 12 or the movable body control signal for controlling the movement of the movable body 14 such that the estimated location of the target is included in the image. Here, the moving speed of the target may be calculated based on changes in the coordinates of the target calculated using the previous images and the distance between the target and the photographing device 12. Alternatively, the moving speed of the target may be received from the distance measuring sensor 13.

Alternatively, to control the photographing device 12 to track the target having the highest priority, the control signal generator 170 may generate the photographing device control signal for controlling panning, tilting and zooming of the photographing device 12 or the movable body control signal for controlling the movement of the movable body 14 such that the coordinates of the highest priority target in the image are maintained. For example, when the coordinates of the highest priority target in a current image are (−100, 80), the photographing device control signal or the movable body control signal may be generated to maintain the coordinates of the highest priority target at (−100, 80) in subsequent images.

If the photographing device control signal and the movable body control signal are generated as described above, when not all objects selected as targets can be tracked by the photographing device 12 or based on the movement of the movable body 14, the photographing device 12 and the movable body 14 can be controlled such that a target with the highest shooting priority is included in an image.

Based on the configuration of the remote weapon control device described above, a method of operating a remote weapon control device will now be described.

Figure 12:
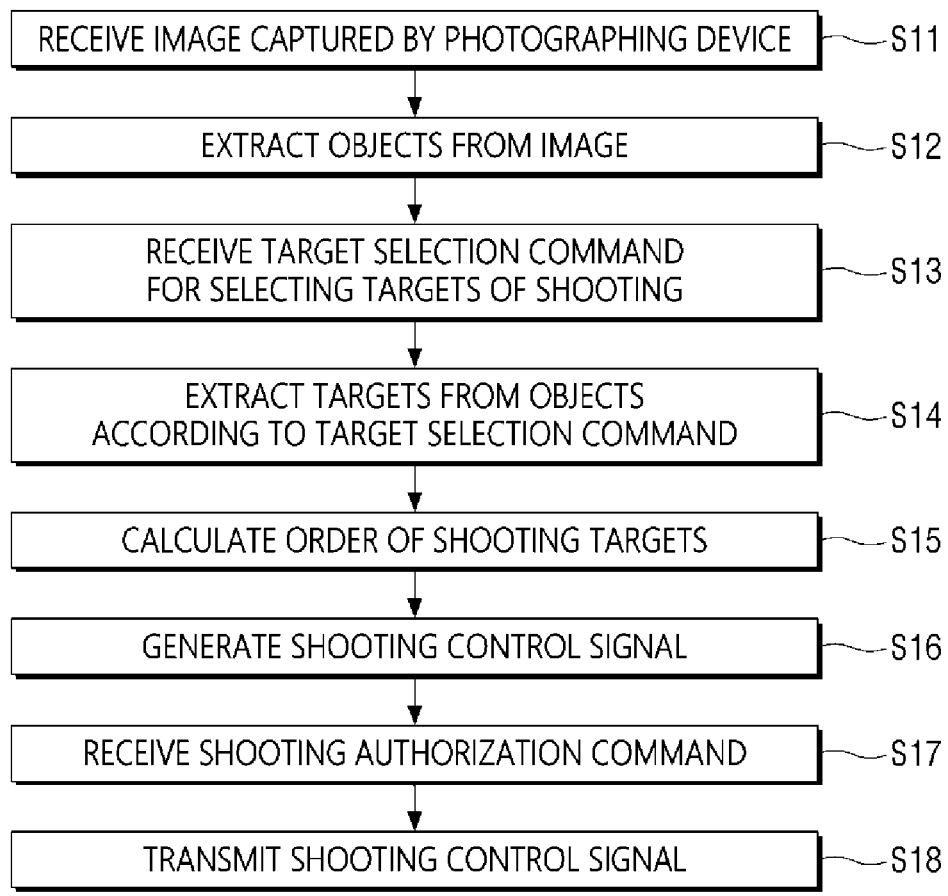
FIG. 12 illustrates a remote weapon control method, according to an exemplary embodiment.

FIG. 12 illustrates a remote weapon control method according to an exemplary embodiment.

An image captured by a photographing device provided in a weapon to remotely control the weapon is received (operation S11). Wireless communication or wired communication may be used in the receiving of the image.

Next, objects that can be shot are extracted from the received image (operation S12). The objects may be extracted using an image processing algorithm for extracting moving objects or an image processing algorithm for extracting still objects using metadata.

Next, a target selection command for selecting targets for shooting is received from a user (operation S13). The target selection command includes an area division command for dividing the image into a plurality of areas, an area selection command for selecting at least one of the areas, a select all command for selecting all objects in the image, and an individual selection command for designating objects selected by the user from among the objects included in the image.

Next, targets are extracted from the objects according to the target selection command (operation S14). Objects in a selected area may be extracted as targets according to the area division command and the area selection command. Alternatively, all objects may be extracted as targets according to the select all command. Alternatively, objects selected according to the individual selection command may be extracted as targets.

Next, the order in which the targets are to be shot is determined (operation S15). The shooting order may be determined based on distances between the weapon and the extracted targets. For example, the shooting order may be determined by prioritizing the targets in order of the largest to the smallest distance from the weapon. Alternatively, the shooting order may be determined by prioritizing the targets in order of the smallest to the largest distance from the weapon. Alternatively, the distances between the weapon and the targets after a reference time may be estimated, and the shooting order may be determined by prioritizing the targets in order of the smallest to the largest estimated distance from the weapon.

Next, a shooting control signal is generated to control the weapon to shoot the targets in the determined order (operation S16). The shooting control signal may include information about the targets, such as azimuths, elevations and distances arranged such that the weapon can aim at the targets in the shooting order.

Next, a shooting authorization command for authorizing the weapon to perform shooting is received from the user (operation S17). Then, the generated shooting control signal is transmitted according to the shooting authorization command (operation S18).

The object extractor 140, the target extractor 150, the shooting order determinator 160, the control signal generator 170 and the node display 180 described above must be able to perform a basic logic operation. Therefore, each of the object extractor 140, the target extractor 150, the shooting order determinator 160, the control signal generator 170 and the node display 180 may be configured as a semiconductor device capable of performing a logic operation such as a central processing unit (CPU), a micro controller unit (MCU), a microprocessor, a field programmable gate array (FPGA), an application specific integrated circuit (ASIC), and the like.

The above exemplary embodiments provide at least one of the following advantages.

Since a plurality of objects are targeted and then shot according to the above exemplary embodiments, the time required to shoot a plurality of targets is reduced as compared with the conventional method of targeting and then shooting objects one by one.

Also, according to the above exemplary embodiments, an area in which objects are located is selected in order to select targets from objects. Therefore, a user can easily and rapidly select targets. That is, when targets are selected one by one, a command for selecting a target needs to input as many times as the number of targets. According to the above exemplary embodiments, however, targets can be selected simply and quickly by two commands, that is, an area division command and an area selection command.

In addition, since an area in which objects are located is selected in order to select targets from objects, a user can easily select objects overlaid on an image as targets.

Furthermore, if a plurality of targets are shot in order of the largest to the smallest distance from a weapon according to the above exemplary embodiment, an accuracy rate of shooting can be increased. Alternatively, if a plurality of targets are shot in order of the smallest to the largest distance from the weapon according to the above exemplary embodiment, it is possible to effectively cope with a threat to the weapon. Alternatively if a plurality of targets are shot by predicting the locations of the targets after a reference time according to the above exemplary embodiment, it is possible to perform shooting by predicting situation changes.

However, the effects of the above exemplary embodiments are not restricted to the one set forth herein. The above and other effects of the exemplary embodiments will become more apparent to one of daily skill in the art to which the exemplary embodiments pertain by referencing the claims.

While the inventive concept has been particularly illustrated and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. The scope of the inventive concept is defined by the following claims, rather than by the above-described detailed description. The meanings and scope of the claims, and all modifications or modified shapes, which are derived from equivalent concepts thereof, should be understood as being included in the scope of the inventive concept.

What is claimed is:

1. A remote weapon control device for controlling a weapon having a camera, the remote weapon control device comprising:
   a display panel;
   a communication interface configured to receive an image captured by the camera;
   at least one processor configured to:
      extract objects from the image;
      identify targets from the objects;
      determine a shooting order of the targets for shooting;
      generate a shooting control signal for controlling the weapon to shoot the targets in the shooting order;
      control the display panel to display the image in a first portion of the display panel with marks that indicate the targets, the image including the targets and at least one of the objects from the image that is not a target; and
      calculate reference coordinates representing the targets in the image, calculate relative coordinates of the targets with respect to the reference coordinates, and control the display panel to display, in a second portion of the display panel that is different from the first portion while the image is displayed in the first portion, nodes located at the relative coordinates with respect to the reference coordinates while the at least one of the objects from the image that is not a target is not depicted in the second portion of the display panel; and an input interface configured to receive, from a user, a target selection command for selecting the targets from the extracted objects;

wherein the target selection command comprises an area division command for dividing the image into a plurality of areas, the area division command comprising manually drawing a boundary line on the image to divide the image into the plurality of areas.

2. The remote weapon control device of claim 1, wherein the at least one processor is further configured to, in response to the area division command and an area selection command being input through the input interface, extract one or more objects located in a selected area as the targets.

3. The remote weapon control device of claim 1, wherein the target selection command comprises a select all command for selecting all objects in the image, and wherein, in response to the select all command being input to the input interface, the at least one processor is further configured to extract all objects in the image as the targets.

4. The remote weapon control device of claim 1, wherein the target selection command comprises an individual selection command for designating objects selected by the user from the objects included in the image, and wherein, in response to the individual selection command being input to the input interface, the at least one processor is further configured to extract the selected objects as the targets.

5. The remote weapon control device of claim 1, wherein the at least one processor is further configured to:

detect an object having a friendly mark among the objects, and extract the objects except the detected object as the targets.

6. The remote weapon control device of claim 1, wherein the weapon comprises a distance measuring sensor configured to measure first distances between a location of the weapon and first locations of the targets, and wherein the at least one processor is further configured to determine the shooting order based on the measured first distances between the location of the weapon and the first locations of the targets.

7. The remote weapon control device of claim 6, wherein the at least one processor is further configured to determine the shooting order by prioritizing the targets in an order of the largest to the smallest distance from the location of the weapon.

8. The remote weapon control device of claim 6, wherein the at least one processor is further configured to determine the shooting order by prioritizing the targets in an order of the smallest to the largest distance from the location of the weapon.

9. The remote weapon control device of claim 6, wherein the at least one processor is further configured to estimate second distances between the location of the weapon and second locations of the targets after a reference time, and determine the shooting order by prioritizing the targets in an order of the smallest to the largest estimated second distances from the location of the weapon.

10. The remote weapon control device of claim 1, wherein sizes of the nodes are changed according to amounts of change in distances between the weapon and the targets.

11. The remote weapon control device of claim 1, wherein the at least one processor is further configured to output a camera control signal for controlling the camera such that at least one of the targets is included in the image.

12. The remote weapon control device of claim 1, wherein the weapon is mounted on a movable body, and wherein the at least one processor is further configured to output a movable body control signal for controlling a movement of the movable body such that at least one of the targets is included in the image.

13. The remote weapon control device of claim 12, wherein the at least one processor is further configured to output at least one of a camera control signal for controlling the camera and the movable body control signal for controlling the movement of the movable body such that a target having a highest shooting priority among the targets is included in the image.

14. The remote weapon control device of claim 1, wherein the communication interface transmits the shooting control signal to the weapon in response to a shooting authorization command being input to the input interface.

15. The remote weapon control device of claim 1, wherein the at least one processor is further configured to:

detect an object that has been shot among the objects, and extract the objects except the detected object as the targets.

16. A remote weapon control method for controlling a weapon having a camera, the remote weapon control method comprising:

receiving an image captured by the camera;

extracting objects from the image;

receiving, from a user, a target selection command for selecting targets for shooting based on the objects;

extracting the targets from the objects according to the target selection command;

determining a shooting order of the targets for the shooting;

generating a shooting control signal for controlling the weapon to shoot the targets in the shooting order;

displaying, in a first portion of a display panel, the image with marks that indicate the targets, the image including the targets and at least one of the objects from the image that is not a target;

calculating reference coordinates representing the targets in the image, calculating relative coordinates of the targets with respect to the reference coordinates, and displaying, on a second portion of the display panel that is different from the first portion while the image is displayed in the first portion, nodes located at the relative coordinates with respect to the reference coordinates while the at least one of the objects from the image that is not a target is not depicted in the second portion of the display panel;

receiving a shooting authorization input from the user; and transmitting the shooting control signal to the weapon according to the shooting authorization input, wherein the target selection command comprises an area division command for dividing the image into a plurality of areas, the area division command comprising manually drawing a boundary line on the image to divide the image into the plurality of areas.

17. The remote weapon control method of claim 16, wherein the receiving the target selection command comprises receiving the area division command for dividing the image into the plurality of areas and an area selection command for selecting at least one of the plurality of areas, and wherein the extracting the targets comprises extracting one or more objects located in a selected area as the targets.

18. The remote weapon control method of claim 16, wherein, in the determining the shooting order, the shooting order is determined based on distances between the weapon and the targets.

19. The remote weapon control device of claim 9, wherein the at least one processor is further configured to estimate the second distances between the location of the weapon and the second locations of the targets by changing the first distances based on an amount of change in the first distances in the reference time.

\* \* \* \* \*